United States Patent Office.

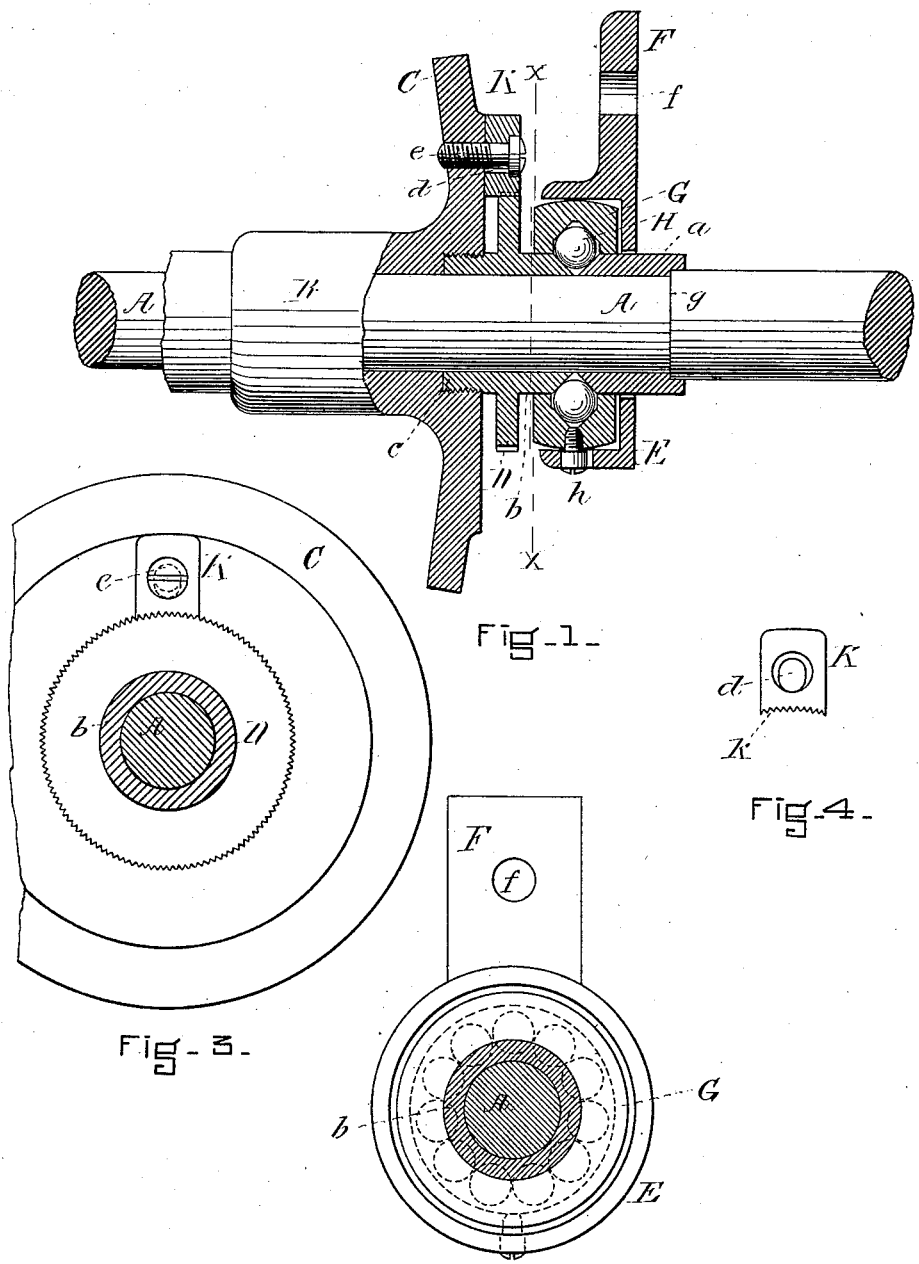

ALBERT E. WALLACE, OF HARTFORD, CONNECTICUT, ASSIGNOR TO THE POPE MANUFACTURING COMPANY, OF BOSTON, MASSACHUSETTS.

AXLE-BEARING FOR VEHICLES.

SPECIFICATION forming part of Letters Patent No. 280,421, dated July 3, 1883.

Application filed March 23, 1883. (No model.)

*To all whom it may concern:*

Be it known that I, ALBERT E. WALLACE, of the city of Hartford, in the State of Connecticut, have invented certain new and useful Improvements in Bearings for Vehicle-Wheels, of which the following is a specification, and which are shown in one form in a contrivance represented in the accompanying drawings, in which—

Figure 1 represents part of an axle and hub of a tricyle in elevation, an anti-friction-bearing device shown in vertical section thereon. Fig. 2 shows parts of the same, partly in transverse section on the line $x\ x$, and other parts on the right of said line in elevation. Fig. 3 shows other parts on the left of the line $x\ x$ in elevation; and Fig. 4 shows in elevation a part of the contrivance, hereinafter described.

My present invention is in the nature of improvements upon contrivances shown in Letters Patent No. 249,278, granted to me November 8, 1881; and it consists in improved means for adjusting the bearing and for securing the adjusting parts in position, and for adjusting and holding the frame of the vehicle and its load with relation to the bearing-box, and in certain details and combinations, all of which will be more fully apparent from the following description.

A is an axle.

B is a hub.

C is a flange.

D is an annulus or circular projection from the sleeve, having a serrated periphery.

$a$ and $b$ are sleeves, or the two complementary parts of a sleeve, on the axle A, having their inclined bearing-surfaces toward each other.

$c$ is an exteriorly-threaded end of the sleeve $b$, which screws into a correspondingly-threaded mortise in a hub, D.

E is a shell-case having an opening for the axle and sleeve, a lug, F, by which it may be attached to the frame of the vehicle, and with a cavity freely fitting the circumference of the bearing-box G. The bearing-box fits freely on the sleeve $a\ b$, contains a circular row of balls, H, and is circular in its section transverse of the axle and rounded on its circumference; or, in other words, is formed so that in section on a plane through its axis, and through the axis of the axle on which it is placed, as shown in Fig. 1, the upper and lower sides are bounded by segments of a circle whose diameter is equal to the greatest diameter of the box G, or else segments of circles whose radii are equal to the diameter of the box G.

K is a button or dog having a circular slot in one face of about the diameter and depth of the head of the screw $e$, which works in a threaded hole in a flange, C, and holds the button K in position. The button K also has a hole or continuance of the slot through the remainder of it about the diameter of the screw $e$, adjacent to its head, and a small slot or extension of the slot $d$, equal in one diameter to the diameter of the screw $e$, and of sufficient depth to allow the button K, when the screw is withdrawn a distance equal to the thickness of its head, to be moved a short distance away from the annulus D, and so as to free the serrated jaw $k$, forming one edge of the button K, from contact with the serrated edge of the annulus D.

$f$ is a hole or slot in the lug F for a bolt, whereby the latter may be fastened to the frame of the tricycle.

$g$ is a shoulder on the axle, or a stop for the sleeve $a$.

$h$ is a screw inserted through the side of the shell-case E into the box G, for the purpose of preventing the box G from revolving in the shell-case.

To put the parts together and operate the same, the half-sleeve $a$ is slipped onto the axle in the position shown. Then the shell-case E, with the box G in it, and partially held thereon by the screw $h$, is slipped on partly over the half-sleeve $a$. Then the balls H are inserted in the ring in the box G and about the axle. Then the half-sleeve $b$, with its annulus D, is slipped on over, before or after which the tenon end $c$ is screwed into the hub B of the wheel, which is then brought to position and secured there. The bearing-boxes, sleeves, balls, cases, and wheel are then approximately in the position shown in Fig. 1. Then by slightly turning the annulus D, either with the thumb and finger, or with a small spanner, the half-sleeve $b$ is made to approach the half-sleeve $a$ until the balls are brought to an exactly-adjusted bearing between the box and the sleeve. The button K is then put in place and secured by driving home the screw e. The lug F may then be attached to the appropriate part of the frame of the tricycle by means of a bolt through the slot f. To loosen or tighten the bearing, by moving the half-sleeve b the screw e is drawn out until the head of it is outside the button K, when the slot d allows the button to be drawn slightly away from the annulus D, disengaging the serrated edge k from the serrated edge of the annulus, so that the latter may be turned, after which the button is again dropped and locked into position, as before.

This improved means for adjusting and locking any adjustment I apply to bicycles as well as tricycles, and it may be obviously applied with slight adaptation to other vehicles.

The operation of the modified bearing-box and shell-case is this: It is obviously desirable in a ball-bearing that the bearing-box, balls, and sleeve be brought to a perfect relative adjustment, and that they should not be thrown out of position after such adjustment. The adjustment of these parts with respect to themselves and the wheel and axle, as above described, and their ready attachment to the frame of a bicycle, and non-disturbance was sufficiently provided for in the hinged lug, as shown in my former patent above referred to; but for attachment to the frame of a tricycle or other vehicle I find it a great improvement to have not only the hinged lug F, which admits of variation in one direction to allow for slight variation in the fitting of the frame or motion thereof, but to provide also for a variation in the transverse direction to allow for the same things, thus making a substantially universal joint or allowance for attachment of the bearing-box of the frame of the vehicle, and for supporting that and the load upon the box in such a manner as not to disturb the relative position of the boxes, balls, and sleeve. It is obvious that the lug F may move either toward or from the flange C, and the load thereon still rest vertically upon the box G without disturbing the relative position of the latter to the other parts.

It is obvious that these improvements may be modified as to form so as to suit the requirements of different positions without departing from the spirit of my invention, and I therefore do not confine myself strictly to the specific forms shown and described.

I claim as new and of my invention—

1. The locking-button K, having slot d and jaw k, in combination with a screw, e, a shaft, and the part fixed thereto, and the annulus on the adjusting part of an anti-friction-bearing mechanism, and constructed and adapted to operate essentially as set forth.

2. Constructed and combined substantially as herein set forth, a two-part sleeve, a bearing-box, a row of balls, a serrated annulus, and a locking-button, with an axle and hub and flange, essentially as shown and described.

3. The combination, in a ball-bearing device, of a free bearing-box, G, and a shell-case, E, substantially as set forth.

4. The combination, essentially, of axle and hub, flange C, button K, screw e, annulus D, cone-sleeve b, with threaded end c, sleeve a, balls H, box G, shell-case E, lug F, and screw h, substantially as set forth.

ALBERT E. WALLACE.

Witnesses:
 WM. B. BROTHERTON,
 G. B. COBURN.